United States Patent Office 3,505,376
Patented Apr. 7, 1970

3,505,376
SILICON-CONTAINING β-PHENYLETHYLAMINES AND INTERMEDIATES FOR THEIR PREPARATION
Max Frankel and David Gertner, Jerusalem, Mordechai Broze, Pardess Hanna, and Albert Zilkha, Jerusalem, Israel, assignors to Yissum Research Development Company of the Hebrew University of Jerusalem
No Drawing. Filed Oct. 22, 1965, Ser. No. 502,442
Claims priority, application Israel, July 29, 1965, 24,062
Int. Cl. C07f 7/10
U.S. Cl. 260—448.2                                31 Claims

ABSTRACT OF THE DISCLOSURE

New silicon organic compounds are provided having the following beta-phenyl-ethylamine skeleton:

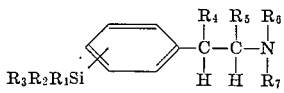

wherein $R_1$, $R_2$ and $R_3$ are the same or different alkyl groups; $R_4$ is hydrogen, hydroxyl or alkyl; $R_5$ is hydrogen, hydroxymethyl, carboxyl or alkyl; $R_6$ is hydrogen or alkyl; and $R_7$ is hydrogen or alkyl and, when $R_6$ is hydrogen, $R_7$ may also be acyl or haloacyl. These thin ethylamines have sympathomimetic activity which differ quantitatively from similar known compounds without the silicon group.

---

The present invention relates to the preparation of new silicon organic compounds having the following β-phenyl-ethylamine skeleton:

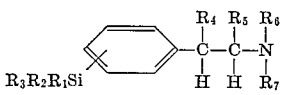

where the benzene ring is substituted in the ortho, meta or para position by a trialkylsilyl group ($SiR_1R_2R_3$), wherein $R_1$, $R_2$, $R_3$ are the same or different alkyl groups; and where $R_4$ is hydrogen, hydroxyl or alkyl group, $R_5$ is hydrogen, hydroxymethyl, carboxyl or alkyl, $R_6$ is hydrogen or alkyl, and $R_7$ is hydrogen or alkyl and—when $R_6$ is hydrogen—$R_7$ may be also acyl or haloacyl. When the various R's are alkyl groups, these are preferably saturated or unsaturated aliphatic-hydrocarbon groups containing 1–6 carbon atoms.

The invention also relates to the preparation of new intermediates for the syntheses of the above compounds having the general structure:

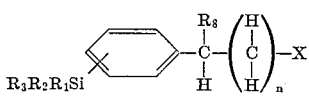

where $R_1R_2R_3$ are as defined above, $n=0$ or 1, X is chlorine, carboxyl, nitrile or hydroxyl, and $R_8$ is hydrogen, alkyl (preferably aliphatic hydrocarbon of 1–6 carbon atoms), or acyl group. It may be noted that the two intermediates p-trimethylsilylbenzyl alcohol and p-trimethylsilyl benzyl cyanide, which are already known, are excluded from this general formula.

Compounds having the β-phenylethylamine structure are medicinally important. They have sympathomimetic activity which causes stimulation of the sympathetic nervous system [Wilson and Gisvold, "Textbook of Organic Medicinal and Pharmaceutical Chemistry," Lippincot Co., Philadelphia, 3rd Ed. (1956) p. 302]. They are used as pressor drugs, since they cause an increase in blood pressure. A large number of β-phenylethylamines were prepared to find out the corelation between structure and sympathomimetic activity (Wilson and Gisvold, loc. cit.). It was found that the introduction of such groups as methyl or hydroxyl in various positions on the β-phenylethylamine skeleton did not generally affect their basic mode of activity and there were only quantitative differences in activity. It is also known that substitution of groups on the α- and β-carbon atoms and on the nitrogen of the ethylamine side chain causes variation in the extent of sympathomimetic activity, mainly due to various degrees of resistance to enzymatic oxidative degradation (see Wilson and Gisvold, loc. cit.).

β-Phenylethylamines are also used as intermediates in the preparation of the medicinally important isoquinoline type of alkaloids such as papaverine of which β-phenylethylamine is a precursor.

Recently some work was reported on the preparation and biological evaluation of some silicon containing analogs of biologically active organic compounds. This interest was aroused by the fact that although silicon is the main constituent of the earth crust, it only rarely appears in living organism. The incorporation of organosilicon in compounds which undergo biological processes is especially interesting to find out in what manner these compounds will take part in such processes. Spirobarbiturates having silicon in a cyclohexyl ring and carbamates having a silicon atom replacing carbon atom [Fessenden, Larson, Coon and Fessenden, J. Med. Chem. 7, 695 (1964)], were prepared and found to qualitatively retain the same type of activity as the corresponding carbon compounds with quantitative differences.

The present invention relates to the preparation of a new type of β-phenylethylamines having a trialkylsilyl group on the benzene ring. This group is bulky and also has an electron withdrawing effect —T, which influences both the biological activity of the compounds and the mode in which the compounds participate in metabolic processes.

The phenylethylamines containing silicon, due to the presence of their alkyl silyl group, have different physical properties from the analogous compounds without silicon; properties such as solubility, partition coefficient and permeability to physiological membranes which affect the physiological properties of the compounds are different. The β-phenylethylamine skeleton is sensitive to degradative oxidation by enzymatic systems (Wilson and Gisvold, loc. cit.). The presence of a trialkylsilyl group due to its electronic effect and large volume will affect this sensitivity.

The syntheses of the compounds encompassed in the present invention has now been accompanied with great difficulties, due to the sensitivity of the silicon-aryl bond to cleavage by strong acids and halogens. Therefore, it has been necessary, in every case, to investigate and modify various special methods for the syntheses of these compounds in which no scission of the silicon group has occurred in the various stages of the syntheses.

β-(p-Trialkylsilylphenyl)-ethylamine and its meta and its ortho isomers were prepared starting from the appropriate trialkylsilyl benzyl bromide, which on reaction with sodium cyanide in ethanol-water was converted to the appropriate trialkylsilyl benzyl cyanide as follows:

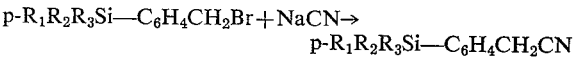

The benzyl cyanides were reduced to β-ethylamine derivatives by reduction with lithium aluminum hydride suspended in an ethereal solvent:

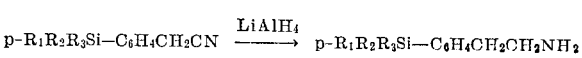

The β-phenylethyl amines prepared were converted to their water soluble salts such as sulfates and chlorides with the corresponding acids.

N,N-dialkyl derivatives of trialkyl silyl ring substituted β-phenylethylamines are also encompassed by the present invention. They were prepared by the following series of reactions which may be exemplified by the preparation of (p-trimethylsilylphenyl)ethyl N,N di-methylamine.

Several methods were tried which can be used in the synthesis of the compounds not containing silicon, but these failed due to the sensitivity of the silicon-aryl bond to split off under strong acid conditions. Thus, for example, the following methods of synthesis did not succeed in the preparation of this compound.

Direct dialkylation of β-(p-trimethylsilylphenyl)-ethylamine with a mixture of 2 moles formaldehyde in formic acid under reflux, a method which was used for dialkylation of β-phenylethylamine ["Organic Synthesis" Collective vol. III, Wiley and Sons, New York, p. 273 (1955)] was found to be unsuitable as the silicon was split off under these conditions. Reaction with dimethylsulfate in the presence of sodium methylate [Johnson and Guest, J. Am. Chem. Soc., 32, 761 (1910)] was unsuccessful. Methylation with methyl iodide in a sealed tube at 100° for 10 hours using a procedure for alkylation of β-phenylethylamine [Woodruff, Lambooy and Burt, J. Am. Chem. Soc., 62, 922 (1940)] was found to be unsuitable as the silicon was split off under these conditions.

These failures show that what is known in the chemistry of carbon compounds, cannot be simply applied to the case of organosilicon compounds.

β - (p - Trimethylsilylphenyl) - ethyl, N,N - dimethylamine was prepared by the following series of reactions. The intermediate silicon compounds are new and were prepared by the method indicated below:

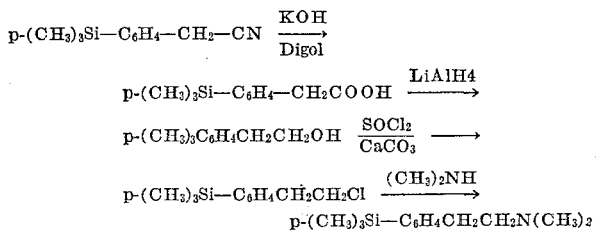

The trialkylsilyl phenylacetic acid could not be prepared from the nitrile by acid hydrolysis, because of cleavage of the silicon-aryl bond. Aqueous alkaline hydrolysis was not feasible because of the insolubility of the nitrile in water. The acid was prepared by carrying out the alkaline hydrolysis in homogenous solution in diethylene glycol (Digol) containing a small amount of water.

The β-(trialkylsilylphenyl) ethanol was obtained by lithium aluminum hydride reduction of the trialkyl phenylacetic acid. To obtain β-(trialkylsilylphenyl)ethyl chloride it was not possible to use the usual acidic reagents for chlorination of hydroxyl groups, e.g., phosphorous trichloride or pentachloride, thionyl chloride etc., for these reagents cause the scission of the aryl-silicon bond. Using thionyl chloride in the presence of pyridine led to side reactions, due to reaction of the phenylethyl chloride formed, with the pyridine, to form a pyridinium salt. It was found by us that the replacement of the hydroxyl by chlorine can be carried out by reaction of the β-(trialkylsilylphenyl) ethyl alcohol with thionyl chloride in benzene solution in the presence of excess powdered anhydrous calcium carbonate, whereby the β-(trialkylsilylphenyl)-ethyl chloride is formed in good yield. The N,N-dialkylamine was obtained by reaction with dialkylamine from the chloride.

The present invention also encompasses the preparation of β-(trialkylsilylphenyl)-ethylamines having an alkyl substituent in the β-position. The preparation of such an amine drivative may be exemplified by the preparation of β-(p-trimethylsilylphenyl)-n-propyl amine. Use was made of the acidity of the α-methylene group of the p-trimethylsilylbenzyl cyanide for alkylation. Thus on reaction of this nitrile, with sodamide, the carbanion was formed:

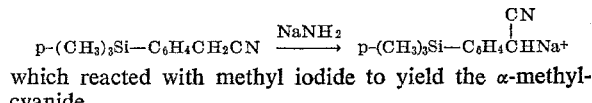

which reacted with methyl iodide to yield the α-methylcyanide

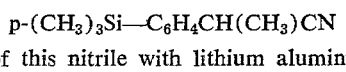

reduction of this nitrile with lithium aluminum hydride yields the β-methyl derivative of the silicon containing phenyl ethyl amine:

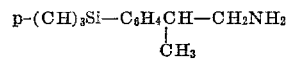

This invention encompasses also the preparation of β-(trialkylsilylphenyl)ethyl amine derivatives having an alkyl substituent on the α carbon atom, such as DL-1-(p-trimethylsilylphenyl)-2-amino propane. This compound is a silicon containing analog of amphetamine (benzedrine) which is used as a valuable chemotherapeutic drug for its stimulating action on the central nervous system [Wislon & Giswold; p. 302; Salmon, Mitchell & Prinzmetal, J. Am. Med. Assoc. 108, 1765 (1937); Chemical Abstracts, 31, 6279⁶ (1937); Nathanson, J. Am. Med. Assoc. 108, 528 (1937)]. It is also used in treatment of nasal congestion, alcoholism, depression conditions and apathy.

The water soluble salts of β-(trialkylsilylphenyl) alkyl ethyl amine are also encompassed in the present invention.

They are prepared by the reaction of acids such as acetic, phosphoric, sulfuric and hydrochloric acid with the amine.

The preparations of these compounds was met with considerable difficulty. Thus in the example of DL-1-(p-trimethylsilylphenyl) 2 amino propane (the alkyl groups being methyls), 4 synthetic routes, which are successfully used in the preparation of benzedrine, were tried in the preparation of the silicon containing analog but met with failure.

It was attempted to prepare p-trimethylsilyl phenyl acetone, which on oxidation and reduction should yield the amphetamine derivative [Organic Synthesis Coll. vol. II, John Wiley and Sons, N.Y. (1944), p. 487]. Thus p-trimethylsilyl benzyl cyanide was condensed with ethyl acetate in the presence of sodium ethoxide, giving 1 cyano,1-(p-trimethylsilylphenyl) acetone. In the hydrolysis of the nitrile the silicon was split off. (Loc. Cit. p. 391).

Experiments to prepare the silicon containing phenyl acetone derivatives by condensation of silicon containing phenylacetic acid with acetic anhydride in the presence of sodium acetate did not lead to the desired product [Mogidson and Carkuska, J. Gen. Chem. (USSR), 11, 339 (1941)]. Experiments of condensation of silicon containing benzaldehyde with nitroethane under various basic conditions also failed. [Organic Synthesis, Coll. vol. I, J. Wiley and Sons, 2nd Edit., N.Y. (1951), p. 413].

It has now been found, however, that DL-1(p-trimethylsilylphenyl)-2 amino propane can be obtained in good yield as follows:

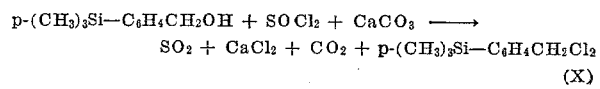

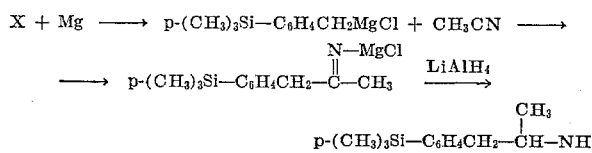

It has been found that the known silicon containing benzyl bromide is too reactive and cannot be used in this reaction. It has now been found necessary to synthesize the silicon containing benzylchloride. Chlorination is not possible, so a new route has now been developed starting from the silicon containing benzyl alcohol; it has been found that the hydroxyl can be replaced by a chlorine group without splitting the silicon-aryl bond by thionyl chloride in presence of calcium carbonate. The Grignard reagent is reacted with methyl cyanide, and the intermediate imine is reduced with lithium aluminum hydride without isolation.

The present invention also encompasses the preparation of trialkylsilyl containing analogs of chloramphenicol (chloromycetine), a well known antibiotic drug.

As an example, the preparation of *threo* 1-(p-trimethylsilylphenyl)-2-dichloroacetamido propane-1,3 diol

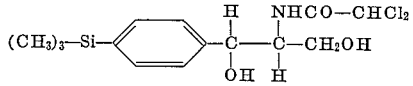

may be mentioned. In this example the propane diol side chain of chloramphenicol is kept intact, since it was found that this chain is essential for antibiotic activity [Collins, Ellis, Hansen, Mackenzie, Moualim, Petrov, Stephenson and Sturgeon, J. Pharm. and Pharmacol 4, 693 (1952)], while the nitro group was replaced by a trialkylsilyl group. It is known that the p-nitro group is not a specific requirement for antibiotic activity since it was found, for example, that replacement of the nitro group by halogen or other electron withdrawing groups led to derivatives which showed antibiotic activity [Buu-Hoi, Hoan, Jacquignon and Khoi, J. Chem. Soc. 2766 (1950)].

DL, *threo* 1 (p - trimethylsilylphenyl) 2 - dichloracetamido propane 1,3 diol was obtained from the known p-trimethylsilyl benzaldehyde:

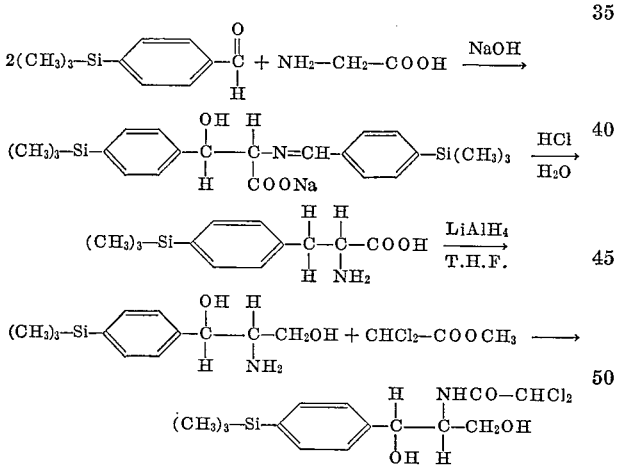

The optimal conditions for the condensation of p-trimethylsilyl benzaldehyde with glycine is the use of about 2–2.5 moles of alkali. The (p-trimethylsilyl) phenylserine has the *threo* configuration. This is seen from the fact that boiling the compound with 6 N hydrochloric acid for 2 hours causes the scission of the tri-alkylsilyl group thereby yielding *threo* phenylserine identical with authentic sample of *threo* phenylserine as seen from paper chromatography (Rf 0.43) [Shaw and Fox, J. Am. Chem. Soc., 75, 3421 (1953)] in the solvents mixture: n-butanol; acetone: concentrated ammonium hydroxide and water (Loc. cit.).

That the p-trimethylsilylphenylserine has the *threo* configuration is also seen noting the similarity of its infrared spectrum with that of *threo* phenylserine but not to the *erythro* [Koegel, Greenstein, Sanford, Birnbaum and Macallum, J. Am. Chem. Soc., 77, 5908 (1955)]. From p-trimethylsilyl phenylserine, p-trimethylsilyl phenylserinol is obtained by reduction with lithium aluminum hydride in tetrahydrofuran. The reduction in ether did not succeed.

DL-1-(p-trimethylsilylphenyl)-2-dichloracetamido propane 1,3 diol is obtained on dichloroacetylation of phenylserinol by heating it with alkyl ester of dichloro acetic acid. Since the starting p-trimethylsilyl phenylserine has the *threo* configuration, the derived trimethylsilyl containing analog of chloramphenicol has the same configuration.

Specific embodiments of this invention are described in the following examples. These examples are merely illustrative, however, and should not be considered as implying any limitations of the scope of this invention.

EXAMPLE 1 m-Trimethylsilyl benzyl cyanide

To a magnetically stirred solution of sodium cyanide (24.5 g., 0.5 mole) in water (32 ml.) was added a solution of m-trimethylsilyl benzyl bromide (92.5 g., 0.38 mole) in ethanol (60 ml.). This was gently refluxed overnight. The reaction mixture was cooled in an ice-bath, filtered and the residue washed with ethanol. The filtrate was concentrated in vacuo, water was added and the mixture was extracted with ether. The aqueous layer was extracted again with ether. The combined ethereal extracts were dried over magnesium sulfate and fractionally distilled. The m-trimethylsilyl benzyl cyanide (54 g., 75%) passed over at 124° C./4.5–5 mm. Hg (B.P. 121–122° C./4 mm. Hg).

*Analysis.*—Calcd. for $C_{11}H_{15}NSi$ (percent): C, 69.79; H, 7.99; N, 7.39; Si, 14.82. Found (percent): C, 69.73; H, 7.89; N, 7.21; Si, 14.60.

EXAMPLE 2 c-Trimethylsilyl benzyl cyanide

This isomer was synthesized from c-trimethylsilyl benzyl bromide and sodium cyanide in a similar manner to Example 1 in 70% yield; B.P. 123° C./4 mm. Hg.

*Analysis.*—Calcd. for $C_{11}H_{15}NSi$ (percent): C, 69.79; H, 7.39; N, 7.39; Si, 14.82. Found (percent): C, 69.77; H, 8.17; N, 7.58; Si, 14.52.

EXAMPLE 3

β-(p-Trimethylsilyl phenyl)-ethylamine

A solution of p-trimethylsilyl benzyl cyanide (18.0 g., 0.1 mole) in dry ether (300 ml.) was added dropwise with stirring to a suspension of lithium aluminum hydride (5.7 g., 0.15 mole) in anhydrous ether (300 ml.). The reaction mixture was refluxed for an additional 30 minutes, cooled in an ice bath, and cold water (a few ml.) was dropped in slowly with stirring to destroy excess reagent. Water (200 ml.) was added and reaction mixture was made alkaline with sodium hydroxide (8 g., 0.2 mole) in water (100 ml.). The mixture was steam distilled and the distillate (about 6 liters) was saturated with sodium chloride and extracted with ether. The ethereal extract was concentrated in vacuo and the amine was taken up in cold 10% hydrochloric acid solution. The acid solution was cooled, was made alkaline with sodium hydroxide solution, and the liberated amine was extracted with ether, dried over sodium sulphate and fractionally distilled. The β-(p-trimethylsilylphenyl)-ethyl amine (13.5 g., 70%) was collected at 113° C./6 mm. Hg, $n_D^{28}$ 1.550.

*Analysis.*—Calcd. for $C_{11}H_{19}NSi$ (percent): C, 68.33; H, 9.90; N, 7.24; Si, 14.51. Found (percent): C, 68.23; H, 9.67; N, 7.00; Si, 14.21.

EXAMPLE 4

β-(p-Trimethylsilylphenyl)ethylamine hydrochloride

β-(p-Trimethylsilylphenyl)-ethylamine (1 g.) was dissolved in dry ether (20 ml.) and cooled in an ice bath. Dry gaseous hydrogen chloride was bubbled in with stirring for 3 minutes. The precipitated crystalline amine hydrochloride was collected, washed with dry ether and dried in vacuo; M.P. 174° C.

*Analysis.*—Calcd. for $C_{11}H_{19}NSi \cdot HCl$ (percent): N, 6.09; HCl, 15.86. Found (percent): N, 6.30; HCl, 15.91 (titration with sodium hydroxide).

EXAMPLE 5

β-(o-Trimethylsilylphenyl)ethylamine

This was synthesized as before by reduction of the cyanide with lithium aluminum hydride and was isolated in 70% yield; B.P. 110° C./4.5 mm. Hg.

*Analysis.*—Calcd. for $C_{11}H_{19}NSi$ (percent): C, 68.33; H, 9.90; N, 7.24; Si, 14.51. Found (percent): C, 68.59; H, 9.85; N, 7.10; Si, 14.25.

EXAMPLE 6

β-(o-Trimethylsilylphenyl)-ethylamine hydrochloride

It was prepared as above in Example 4.

*Analysis.*—Calcd. for $C_{11}H_{19}NSi \cdot HCl$ (percent): N, 6.09; HCl, 15.86. Found (percent): N, 6.30; HCl, 15.70.

EXAMPLE 7

β-(m-Trimethylsilylphenyl)-ethylamine

This amine was synthesized by the same procedure as β-(p-trimethylsilylphenyl)-ethylamine, in 70% yield; B.P. 107° C./mm. Hg.

*Analysis.*—Calcd. for $C_{11}H_{19}NSi$ (percent): C, 68.33; H, 9.90; N, 7.24; Si, 14.51. Found (percent): C, 68.60; H, 10.07; Si, 14.36; N, 7.00.

EXAMPLE 8

β-(p-Trimethylsilylphenyl)-ethylamine hydrochloride

It was prepared as above in Example 4; M.P. 123° C.

*Analysis.*—Calcd. for $C_{11}H_{19}NSi \cdot HCl$ (percent): N, 6.09; HCl, 15.86. Found (percent): N, 6.10; HCl, 15.63.

EXAMPLE 9 p-Trimethylsilylphenyl acetic acid

Potassium hydroxide (30 g., 0.5 mole) was dissolved with heating in diethylene glycol (digol) (125 ml.) and the light brown solution was diluted with digol (375 ml.). p-Trimethylsilyl-benzyl cyanide (37.8 g., 0.2 mole) and water (72 ml., 4 mole) were added and the reaction mixture refluxed for 6 hours. Gaseous ammonia was liberated. The reaction mixture was cooled, diluted with water (100 ml.) and acidified with cold concentrated hydrochloric acid (200 ml.). The solution was extracted with ether and the ethereal layer washed with water (to extract dissolved digol). It was extracted from the ethereal solution by dilute sodium hydroxide. The alkaline solution was cooled, and acidified with cold hydrochloric acid. It was taken up in ether and dried over magnesium sulfate. The p-(trimethylsilyl)-phenyl acetic acid crystallized out on evaporation of the ether. It was further purified by fractional distillation in vacuo, the acid (33.3 g., 80%) being passed over at 133° C./0.2 mm. Hg (B.P. 138° C./1 mm. Hg or 168° C./5 mm. Hg), as a viscous liquid which crystallized out on cooling to a white solid, having a faint acetic acid odor, M.P. 40° C.

*Analysis.*—Calc'd for $C_{11}H_{16}O_2Si$ (percent): C, 63.42; H, 7.74; Si, 13.47. Found (percent): C, 63.42; H, 7.66; Si, 13.45.

EXAMPLE 10

(m-Trimethylsilyl)-phenyl acetic acid

This isomer was synthesized in 80% yield from the corresponding m-trimethylsilyl benzyl cyanide B.P. 145° C./2 mm. Hg, M.P. 34° C.

*Analysis.*—Calc'd for $C_{11}H_{16}O_2Si$ (percent): C, 63.42; H, 7.74; Si, 13.47. Found (percent): C, 63.29; H, 7.60; Si, 13.30.

EXAMPLE 11

(o-Trimethylsilylphenyl) acetic acid

This was similarly prepared in 80% yield from the cyanide, B.P. 170° C./4 mm. Hg.

*Analysis.*—Calc'd for $C_{11}H_{16}O_2Si$ (percent): C, 63.42; H, 7.74; Si, 13.47. Found (percent): C, 63.74; H, 7.97; Si, 13.21.

EXAMPLE 12

β-(p-Trimethylsilylphenyl) ethyl alcohol)

A solution of p-(trimethylsilyl) phenyl acetic acid (28 g., 0.135 mole) in dry ether (180 ml.) was added dropwise to a stirred suspension of lithium aluminum hydride (6.46 g., 0.17 mole) in dry ether (200 ml.). The acid solution was added at such a rate so as to cause gentle boiling of the reaction mixture. The reaction mixture was refluxed for an additional 15 minutes, cooled, and excess reagent destroyed by cautious addition of cold water. A cold aqueous 10% sulfuric acid solution (200 ml.) was added and the ethereal layer separated. The aqueous layer was extracted with ether, the combined ethereal extracts were washed with dilute bicarbonate solution followed by water and then dried over magnesium sulfate. β-(p-Trimethylsilylphenyl) ethyl alcohol was collected on fractional distillation in vacuo; B.P. 103° C./1 mm. Hg (108° C./1.5 mm. Hg or 125° C./3.25 mm. Hg); yield 23.5 g. (90%). It is a viscous liquid, with a pleasant odor.

*Analysis.*—Calc'd for $C_{11}H_{18}OSi$ (percent): C, 67.99; H, 9.33; Si, 14.44. Found (percent): C, 68.25; H, 8.88; Si, 14.29.

EXAMPLE 13

β-(p-Trimethylsilylphenyl) ethyl chloride

To a well stirred mixture of β-(p-trimethylsilylphenyl)-ethyl alcohol (12 g., 0.062 mole) in dry benzene (60 ml.) and powdered calcium carbonate (25 g., 0.25 mole) pure redistilled thionyl chloride (14.3 g., 0.12 mole) was dropped in during one hour and refluxed for 2 hours. The reaction mixture was filtered and the precipitate washed with dry benzene. The benzene solutions were concentrated in vacuo and the β-(p-trimethylsilylphenyl)-ethyl chloride (11.9 g., 90%) was collected on distilling in high vacuum; B.P. 112° C./1.5 mm. Hg (B.P. 120° at 3 mm. Hg).

*Analysis.*—Calc'd for $C_{11}H_{17}ClSi$ (percent): C, 62.09; H, 8.06; Cl, 16.67; Si, 13.19. Found (percent): C, 62.23; H, 7.88; Cl, 16.60; Si, 13.01.

EXAMPLE 14

β-(p-Trimethylsilylphenyl)-ethyl dimethylamine

β-(p-Trimethylsilylphenyl)-ethyl chloride (4.25 g., 0.02 mole) was added to dimethylamine (9 g., 0.2 mole) in absolute ethanol (18 g.) and the solution heated in a sealed glass tube for 3 hours. Excess dimethylamine and alcohol were driven off in vacuo, water (25 ml.) and sodium hydroxide (4 g., 0.1 mole) added, and the free amine was taken up in ether. The aqueous layer was extracted with ether and the combined ethereal extract dried over sodium sulfate. The ether was evaporated in vacuo and the β-(p-trimethylsilylphenyl) ethyl dimethyl amine was collected at 105° C./2 mm. Hg (3.8 g., 85%).

*Analysis.*—Calc'd for $C_{13}H_{23}NSi$ (percent): C, 70.53; H, 10.47; N, 6.32; Si, 12.68. Found (percent): C, 70.60; H, 10.43; N, 6.23; Si, 12.50.

EXAMPLE 15

β-(p-Trimethylsilylphenyl)-ethyl dimethylamine hydrochloride

The hydrochloride of β-(p-trimethylsilylphenyl)-ethyl dimethylamine was prepared as above, M.P. 215° C.

*Analysis.*—Calc'd for $C_{13}H_{23}NSi \cdot HCl$ (percent): HCl, 14.13. Found (percent): HCl, 14.10.

EXAMPLE 16

α-(p-Trimethylsilylphenyl)-propionitrile

P-Trimethylsilylbenzyl cyanide (9.45 g., 0.05 mole) was added slowly during 30 minutes with stirring to a suspension of powdered sodamide (2.15 g., 0.055 mole) in dry ether (50 ml.). The reaction mixture became red brown and was stirred for another 30 minutes. Methyl iodide (7.8 g., 0.055 mole) was dropped in during 30 minutes and stirred for 1 hour. Water was added, the ether layer separted and the aqueous layer was extracted again with ether. The combined ethereal extracts were dried over $MgSO_4$, and the ether removed in vacuo. The α-(p-trimethylsilyl)-propionitrile (7.8 g., 80%) was collected at 130° C./5–6 mm. Hg. It is a colorless liquid with a nitrile smell.

*Analysis.*—Calc'd for $C_{12}H_{17}NSi$ (percent): C, 70.88; H, 8.43; N, 6.89; Si, 13.80. Found (percent): C, 71.15; H, 8.28; N, 6.84; Si, 13.65.

EXAMPLE 17

β-(p-Trimethylsilylphenyl)-propyl amine

*Method A.*—The amine was obtained as above in 70% yield by reduction of the nitrile α-(p-trimethylsilylphenyl)-propionitrile with lithium aluminum hydride.

*Method B.*—By this method the reduction was carried out on the reaction mixture obtained after methylation of p-trimethylsilylbenzyl cyanide without further isolation. The reaction mixture obtained, starting from (9.45 g.) p-trimethylsilylphenyl acetic acid, was filtered from sodium iodide under argon and added dropwise with stirring during 1 hour to a suspension of lithium aluminum hydride (2.5 g., 0.065 mole) in dry ether (150 ml.). This was refluxed for an additional hour. Water was added cautiously to the cooled mixture, followed by dilute sodium hydroxide and the amine was then isolated by steam distillation and purified by the procedure given for β-(p-trimethylsilylphenyl)-ethylamine. β-(p-trimethylsilylphenyl)-propylamine was thus obtained in 60% yield, B.P. 114° C./4.5 mm. Hg.

*Analysis.*—Calc'd for $C_{12}H_{21}NSi$ (percent): C, 69.54; H, 10.21; N, 6.75; Si, 13.53. Found (percent): C, 69.24; H, 10.45; N, 7.00; Si, 13.45.

EXAMPLE 18 p-Trimethylsilyl benzyl chloride

Thionyl chloride (16 g., 0.134 mole) freshly distilled was added dropwise with stirring to p-trimethylsilyl benzyl alcohol (12 g., 0.067 mole) in dry benzene (60 ml.) and dry powdered calcium carbonate (27 g., 0.27 mole) while the temperature was maintained at 20° C. The reaction mixture was refluxed for 2 hours, filtered, and washed with dry benzene. The benzene was driven off in vacuo and the p-trimethylsilyl benzyl chloride (10.7 g., 80%) was collected at 105° C./6–7 mm. Hg (109° C./8 mm. Hg). It is a pungent smelling colorless liquid.

*Analysis.*—Calcd. for $C_{10}H_{15}ClSi$ (percent): C, 60.41; H, 7.60; Cl, 17.82; Si, 14.11. Found (percent): C, 60.30; H, 7.46; Cl, 17.50; Si, 13.85. [The chlorine was determined by anhydrous titration. A. Patcornich and S. Erlich Rogozinski, Anal. Chem., 31, 985 (1959).]

EXAMPLE 19

DL-1-(p-trimethylsilylphenyl) 2-aminopropane (p-trimethylsilyl benzedrine)

In a three-necked flask fitted with stirrer, dropping funnel and reflux condenser, were introduced dry magnesium turnings (0.96 g., 0.04 mole), anhydrous ether (7 ml.) and a small crystal of iodine. A solution of p-trimethylsilylbenzyl chloride (7.92 g., 0.04 mole) in ether (8 ml.) was added dropwise during 15 min., and the reaction mixture was refluxed for another 15 min. Dry distilled (from phosphorous pentoxide) methyl cyanide (1.64 g., 0.04 mole) was added dropwise and the reaction mixture refluxed for 2 hours. A slurry of lithium aluminum hydride (1.73 g., 0.04 mole) in dry tetrahydrofuran (15 ml.) was added dropwise and the reaction mixture was refluxed for 7 hours. The ether and tetrahydrofuran were removed from a water bath at 40° C. in vacuo. Dry ether was added to the viscous residue, followed by moist ether, water, and dilute sodium hydroxide. The liberated amine was steam distilled, and the distillate (3 liters) saturated with salt. The DL-1-(p-trimethylsilylphenyl) 2-aminopropane was purified as in the case of β-(p-trimethylsilylphenyl)-ethylamine, and fractionally distilled to yield 4.0 g. (48%); B.P. 122° C./6 mm. Hg.

*Analysis.*—Calcd. for $C_{12}H_{21}NSi$ (percent): C, 69.54; H, 10.21; N, 6.75; Si, 13.53. Found (percent): C, 69.84; H, 9.95; N, 6.70; Si, 13.31.

EXAMPLE 20

DL-1-(p-trimethylsilylphenyl)-2-amine-propane hydrochloride

The amine hydrochloride of DL-1-(p-trimethylsilylphenyl)-2-aminepropane (p-trimethylsilyl benzedrine) was prepared as above; M.P. 214° C.

*Analysis.*—Calcd. for $C_{12}H_{21}NSi.HCl$ (percent): HCl, 14.95. Found (percent): HCl 14.80.

EXAMPLE 21

DL-1-cyano-1-(p-trimethylsilyl) phenyl acetone

To a solution of sodium metal (5.1 g., 0.22 mole) in absolute ethanol (60 ml.) p-(trimethylsilyl) benzyl cyanide (17.0 g., 0.09 mole) and ethyl acetate (dried over phosphorous pentoxide) (22.3 g.) were added, and the reaction mixture was refluxed for 2 hours with stirring and left overnight. The sodium salt of DL-1-cyano-1-(p-trimethylsilyl) phenyl acetone (17.1 g., 75%) was filtered off and washed 4 times with dry ether (25 ml.); it was dissolved in water (70 ml.) cooled in an ice bath and DL-1-cyano-1-(p-trimethylsilyl) phenyl acetone precipitated out by the slow addition of glacial acetic acid (8 ml.). DL-1-cyano-1-(p-trimethylsilyl) phenyl acetone was filtered and washed with water to yield 12.9 g., (62%); M.P. 79° C. on recrystallization from methanol.

*Analysis.*—Calcd. for $C_{13}H_{17}ONSi$ (percent): C, 67.49; H, 7.41; N, 6.05; Si, 12.13. Found (percent): C, 67.14; H, 7.31; N, 6.10; Si, 11.81.

EXAMPLE 22

DL-*threo*-β-(p-trimethylsilyl)-phenylserine

Glycine (3.75 g., 0.05 mole) was dissolved in a solution of sodium hydroxide (4.4 g., 0.11 mole) in water (16.5 ml.), cooled to 15° C., and freshly distilled p-trimethylsilyl benzaldehyde (17.8 g., 0.1 mole) was added with magnetic stirring. The reaction mixture was stirred overnight. It solidified to a hard cake, which was broken up and neutralized with hydrochloric acid (1:1) (0.11 mole) and left at 4° overnight. Ether (100 ml.) was added and the reaction mixture was brought to pH 6. After stirring for several minutes, a voluminous precipitate formed which was filtered and washed thoroughly with water to extract traces of unreacted glycine, followed by ether to extract unreacted aldehyde and traces of alcohol and acid formed by a Cannizarro side reaction or oxidation. The crude material (11.3 g., 90%) was recrystallized from methanol-water (9:4) to yield 7.6 g. (60%) of pure DL-*threo*-β-(p-trimethylsilyl) phenylserine, M.P. 165–166° C.

*Analysis.*—Calcd. for $C_{12}H_{19}NO_3Si$ (percent): C, 56.89; H, 7.56; N, 5.53; Si, 11.09. Found (percent): C, 56.95; H, 7.53; N, 5.45; Si, 10.90.

EXAMPLE 23

DL-*threo*-1-(p-trimethylsilylphenyl)-2-amino-propane-1,3-diol

DL-*threo*-β-(p-trimethylsilyl)-phenylserine (5.06 g., 0.02 mole) was added in small portions during 1 hour to a solution of lithium aluminum hydride (2.28 g., 0.06 mole) in dry distilled tetrahydrofuran (100 ml.), refluxed for 8 hours and left overnight. The reaction mixture was cooled and moist ether (60 ml.) was slowly and cautiously added, followed by water (3.6 ml.). The reaction mixture was filtered, the filtrate evaporated to dryness in vacuo and taken up in dry ether. The precipitate was extracted with dry ether for 7 hours in a soxhlet apparatus. The combined ethereal extracts were evaporated in vacuo and the viscous residue was dissolved in dry ether, dried over magnesium sulfate and evaporated in vacuo. The residue was taken up in petroleum ether (B.P. 40–60° C.) (25 ml.) heated and left to crystallize overnight at 20° C. The p-trimethylsilyl phenylserinol was filtered and washed with petroleum ether to yield 3.82 g. (80%); M.P. 77° C. on recrystallization from ether-petroleum ether.

*Analysis.*—Calcd. for $C_{12}H_{21}NO_2Si$ (percent): C, 60.21; H, 8.84; N, 5.84; Si, 11.73. Found (percent): C, 60.14; H, 8.93; N, 5.90; Si, 11.59.

EXAMPLE 24

DL-*threo*-1-(p-trimethylsilylphenyl)-2 dichloroacetamidopropane-1,3-diol p-Trimethylsilyl phenylserinol (1.2 g., 0.005 mole) and methyl dichloroacetate (7.15 g., 0.05 mole, excess) were heated on a water bath for 2.5 hours. Excess methyl dichloroacetate was distilled off by heating the reaction mixture in vacuo to 85° C. at 1 mm. Hg. The residue was taken up in a minimum amount of ether, filtered, diluted with 5 volumes of petroleum ether and left to crystallize at −20° C. The crystallized DL-*threo*-1-(p-trimethylsilylphenyl)-2-dichloroacetamidopropane-1,3 - diol (1.57 g., 90%) was collected, M.P. 121° C.

*Analysis.*—Calcd. for $C_{14}H_{21}NO_3Cl_2Si$ (percent): C, 48.00; H, 6.04; N, 4.00; Cl, 20.24; Si, 8.02. Found (percent): C, 47.68; H, 5.81; N, 4.20; Cl, 19.90; Si, 7.90.

The trialkyl silyl-β-phenyl-ethylamines of the present invention are useful in the medicinal fields as is illustrated in the following examples:

EXAMPLE 25

It was attempted to lower the blood pressure by β-p-trimethylsilyl phenylethylamine hydrochloride (MB2), β - p - trimethylsilyl phenyl propylamine hydrochloride (MB12), and p-trimethylsilyl amphetamine hydrochloride (DL-1-p-trimethylsilyl phenyl 2-amino propane) (MB26) in the following manner:

Blood pressure was measured with a Hg-manometer or with a pressure transducer on a physiograph. Respiration was recorded with bellows or with impedance electrodes and heart rate with an EGG transducer.

The compounds were dissolved in a saline medium.

*Results.*—The results obtained are given in Table I.

From the table it is seen that all three compounds consistently caused a lowering of blood pressure. All three compounds caused an increase of respiration whereas heart rate was not affected.

TABLE I

[Effects on Blood Pressure, Respiration and Heart Rate in Anaesthetized (Nembutal 30 mg./kg. i.v.) Cats and Anaesthetized (Urethane 1.3 g./kg. i.p.) Guinea-Pig.—Solutions were administered through a cannula placed in femoral vein]

| Compound | Animal | Dose (mg./kg.) | Lowering of Blood Pressure Mm. Hg (mean) | Duration in Minutes (mean) | Increase of Respiration Rate (percent) | Effect on Heart Rate, ↓=decrease ↑=increase |
|---|---|---|---|---|---|---|
| MB2 | Guinea Pig | 0.1 | 10 | 15 | 130 | None. |
|  | do | 0.5 | 15 | 15 | 300 | Do. |
|  | do | 1 | 25 | 15 | 300 | Do. |
|  | do | 2 | 35 | 15 | 330 | Do. |
|  | Cat | 0.5 | 30 | 1 | 40 | Do. |
|  | Cat | 1 | 50 | 3 | 150 | Do. |
|  | Cat | 2 | 60 | 7 | 220 | 10% ↑. |
|  | Cat | 3 | 70 | 7 | 250 |  |
|  | Cat | 5 | 100 | 8 |  |  |
|  | Cat | 10 | 120 | 1[1] |  |  |
| MB12 | Guinea Pig | 1 | None | None | None | None. |
|  | do | 5 | 20 | 20 | 350 | 10% ↓. |
|  | Cat | 0.5 | 15 | 1 | None | Do. |
|  | Cat | 1 | 30 | 1.5 | 130 | Do. |
|  | Cat | 2 | 50 | 1 | 140 |  |
|  | Cat | 3 | 80 | 7 | 250 | 10% ↑. |
|  | Cat | 5 | 100 | 5 |  | 20% ↑. |
|  | Cat | 10 | 130 | 1[1] |  |  |
| MB26 | Cat | 0.5 | 10 | 1 | 15 | None. |
|  | Cat | 1 | 40 | 1 | 40 | Do. |
|  | Cat | 2 | 70 | 30 | 250 |  |

[1] Animal succumbed following the injection.

EXAMPLE 26

Psychotropic Tests of MB2, MB12 and MB26 were conducted and results summarized below:

*Psychotropic tests: Rotarod test—Mice.*—(6 mice per group—Intraperitoneal injection). Results in Table II.

TABLE II

| Compound | Dose (mg./kg.) | Average percent reduction in performance after— | | | |
|---|---|---|---|---|---|
|  |  | 15′ | 30′ | 60′ | 90′ |
| MB2 | 20 | 0 | 0 | 0 | 0 |
| MB2 | 40 | [1]40% | 0 | 0 | 0 |
| MB12 | 20 | 0 | 0 | 0 | 0 |
| MB12 | 40 | 0 | 0 | 0 | 0 |
| MB26 | 20 | 0 | [1]0 | 0 | 0 |

[1] Slight piloerection was observed.

*Activity Cage.*—(10 animals were used for each dose level. Intraperitoneal injection. Controls were injected with saline.) The results are in Table III.

TABLE III

| Compound [1] | Dose (mg./kg.) | Average percent reduction of activity 30 min. after injection |
|---|---|---|
| MB2 | 10 | 0 |
| MB2 | 20 | 24 |
| MB2 | 40 | 29 |
| MB12 | 10 | 25 |
| MB12 | 20 | 27 |
| MB12 | 40 | 37 |

[1] As it was noticed that the structure of the compounds closely resembled that of amphetamine, control experiments were carried out administering the latter at a dose of 10 mg./kg. i.p. Under identical conditions, amphetamine increased motor activity by 70%.

*Reversal of reserpine effects:* (Analeptic action).—All groups (5 mice per group) were injected intraperitoneally 3 hours after administration of Reserpine (25 mg./kg. subcutaneously).

Controls were injected with DL-amphetamine 20 mg./kg. intraperitoneally which caused complete Reserpine reversal i.e. arousal from sedated state, cessation of ptosis. This reversal lasted for at least 3 hours and after that period the animals again returned to the sedated state. The results are tabulated in Table IV.

TABLE IV

| Compounds | Dose (mg./kg.) | Reversal of Reserpine Effects |
|---|---|---|
| MB2 | 10 | No. |
| MB2 | 20 | No. |
| MB2 | 30 | No. |
| MB12 | 10 | No. |
| MB12 | 20 | No. |
| MB12 | 30 | No. |
| MB26 | 20 | Very slight, delayed and short-lasting Reserpine reversal. |

*Meriones digging test:* (4 meriones per dose level).—Intraperitoneal injection. The results are tabulated in Table V.

TABLE V

| | | Results After [1]— | |
|---|---|---|---|
| Compound | Dose (mg./kg.) | 30' | 60' |
| MB2 | 10 | 1/4 | 0/4 |
| MB2 | 20 | 4/4 | 3/4 |
| MB12 | 10 | 2/4 | 0/4 |
| MB12 | 20 | 3/4 | 4/4 |

[1] Numerator indicates number of animals which did not dig. Denominator indicates number of animals injected.

*Conditional advoidance response—Rats:* (3 rats per dose level.—Results in Table VI below.

TABLE VI

| Compound | Dose (mg./kg.) | Average percent Reduction of conditioned response, tested 1 hour after injection |
|---|---|---|
| MB2 | 5 i.p. | 3 |
| MB2 | 10 i.p. | 11 |
| MB2 | 20 i.p. | [1] [3] 30 |
| MB2 | 20 s.c. | [4] 0 |
| MB2 | 40 i.p. | [2] [3] 75 |
| MB2 | 40 s.c. | [4] 2 |
| MB12 | 5 i.p. | 3 |
| MB12 | 10 i.p. | 35 |
| MB12 | 20 i.p. | 61 |
| MB12 | 40 i.p. | [4] 74 |
| MB12 | 40 s.c. | 0 |

[1] 1 rat died 3 days after injection.
[2] 2 rats died within 3 days after injection.
[3] Slight ptosis and slight sedation were observed.
[4] In some of the animals haematuria was observed during the test.

NOTE.—Post mortem examination in 2 of the animals that succumbed revealed: Ascites. The fluid was brownish-red and sticky. Diffuse peritonitis was also found.

It will be obvious to those skilled in the art that various changes may be made without departing from the spirit of the invention and therefore the invention is not limited to what is described in the specification, but only as indicated in the appended claims.

What is claimed is:

1. Organosilicon compounds having the following β-phenylethylamine structure:

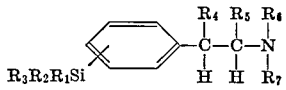

wherein $R_1$, $R_2$, $R_3$, are alkyl groups; $R_4$ is selected from the group consisting of hydrogen, hydroxyl and alkyl group; $R_5$ is selected from the group consisting of hydrogen, hydroxymethyl, carboxyl and alkyl; $R_6$ is selected from the group consisting of hydrogen and alkyl; and $R_7$ is selected from the group consisting of hydrogen, alkyl and, when $R_6$ is hydrogen, acyl and haloacyl.

2. Organosilicon compounds used as intermediates in the preparation of the β-phenylethylamines of claim 1, said intermediates having the general structure:

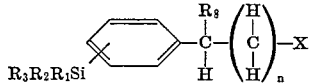

wherein $R_1 R_2 R_3$ are alkyl groups; $n$ is an integer of from 0 to 1; X is selected from the group consisting of chlorine, carboxyl, nitrile and hydroxyl; and $R_8$ is selected from the group consisting of hydrogen, alkyl and acyl group, but excluding p-trimethylsilylbenzyl alcohol and p-trimethylsilyl benzyl cyanide.

3. Water soluble salts of the β-phenylethylamines of claim 1, with acids.

4. Trimethylsilyl benzyl cyanide selected from the group of isomers consisting of the ortho and meta isomers.

5. β-(Trimethylsilyl-phenyl) ethylamine.

6. β-(Para trimethylsilyl phenylethyl) alcohol.

7. β-(Trimethylsilylphenyl) ethyl chloride.

8. β-(p-Trimethylsilylphenyl) ethyl dimethylamine.

9. α-(p-Trimethylsilylphenyl) alkylnitriles.

10. α-(p-Trimethylsilylphenyl) propionitrile.

11. β-(p-Trimethylsilylphenyl) propylamine.

12. Trimethylsilyl benzyl chloride.

13. 1-(trimethylsilylphenyl)-2-amino propane.

14. 1-cyano-1(p-trimethylsilylphenyl) acetone.

15. Para trimethylsilylphenyl serine.

16. 1-(p-trimethylsilylphenyl) - 2 - amino propane 1,3 diol.

17. 1-(p - trimethylsilylphenyl) - 2 - dichloroacetamido propane, 1,3 diol.

18. A method for the preparation of β-(ortho-trimethylsilyl-phenyl) ethylamine, β-(meta-trimethylsilyl-phenyl) ethylamine and β-(para-trimethylsilyl-phenyl) ethylamine and their water soluble hydrochloride salts, comprising reacting trimethylsilyl benzyl cyanide with lithium aluminum hydride.

19. A method for the preparation of ortho-trimethylsilyl phenylacetic acid, meta trimethylsilyl phenyl acetic and para trimethylsilyl phenylacetic acid, comprising affecting alkaline hydrolysis of the methyl silyl benzyl cyanide in a solution of diethylene glycol.

20. A method for the preparation of β-(trimethylsilylphenyl) ethyl alcohol, comprising reducing the products of claim 19 with lithium aluminum hydride.

21. A method for the preparation of β-(para trimethylsilylphenyl) ethyl chloride, β-(ortho trimethylsilylphenyl)-ethyl chloride and β-(meta trimethylsilylphenyl)-ethyl chloride, comprising reacting the product of claim 20 with thionyl chloride in benzene solution in the presence of excess powdered anhydrous calcium carbonate.

22. A method for the preparation of β-(trimethylsilylphenyl)-ethyl dimethylamine and its hydrochloride, comprising reacting the product of claim 21 with dimethylamine.

23. A method for the preparation of α-(trimethylsilylphenyl) alkylnitriles, comprising reacting -trimethyl silyl-benzyl cyanide with sodamide and then with an organic halide.

24. A method for the preparation of α-(trimethylsilylphenyl) propionitrile in accordance with claim 23 wherein the iodide is methyl iodide.

25. A method for the preparation of α-(p-trimethylsilylphenyl) propylamine and its hydrochloride, comprising reducing the product of claim 24 with lithium aluminum hydride.

26. A method for the preparation of ortho-trimethylsilyl benzyl chloride, meta-trimethylsilyl benzyl chloride and para-trimethylsilyl benzyl chloride, comprising reacting trimethyl silyl benzyl alcohol with thionyl chloride in benzene in the presence of anhydrous powdered calcium carbonate.

27. A method for the preparation of 1-(ortho-trimethylsilylphenyl) - 2 - amino propane, 1 - (meta - trimethylsilylphenyl) - 2 - amino propane, 1 - (para - trimethylsilylphenyl)-2-amino propane and their hydrochlorides, comprising reacting the product of claim 26 with magnesium and then with methyl cyanide, and then reducing with lithium aluminum hydride.

28. A method for the preparation of 1-cyano-1-(p-trimethylsilylphenyl) acetone, comprising reacting p-(trimethyl silyl) benzyl cyanide with sodium and ethyl acetate.

29. A method for the preparation of β-(para-trimethylsilylphenyl) serine, comprising reacting p-trimethyl silyl benzaldehyde with glycine.

30. A method for the preparation of 1-(p-trimethylsilylphenyl)-2-amino propane 1,3 diol, comprising reacting the product of claim 29 with lithium aluminum hydride.

31. A method for the preparation of 1-(p-trimethylsilylphenyl)-2-dichloroacetamido propane 1,3 diol, comprising reacting the product of claim 30 with methyl dichloroacetate.

References Cited

UNITED STATES PATENTS

| | | | |
|---|---|---|---|
| 2,998,406 | 8/1961 | Bailey et al. | 260—448.2 X |
| 3,177,236 | 4/1965 | Jex et al. | |

OTHER REFERENCES

Bazant et al., "Organosilicon Compounds," Academic Press, N.Y. (1965), vol. 2, part 1, p. 432.

"Chemical and Engineering News," 32, p. 1324 (1954).

TOBIAS E. LEVOW, Primary Examiner

P. F. SHAVER, Assistant Examiner

U.S. Cl. X.R.

424—184